United States Patent
Noh et al.

(10) Patent No.: US 9,938,386 B2
(45) Date of Patent: Apr. 10, 2018

(54) ROUGHNESS IMPROVED HIGH GLOSS ABS SHEET AND PROCESS FOR PREPARING THEREOF

(71) Applicants: Hyundai Motor Company, Seoul (KR); GWANGJU INSTITUTE OF SCIENCE AND TECHNOLOGY, Gwangju (KR)

(72) Inventors: Eun Ju Noh, Changwon-si (KR); Min Hee Lee, Seoul (KR); Hey Jeong Lee, Seoul (KR); Jeong Hun Kwak, Gwangju (KR); Wan Sik Kim, Mokpo-si (KR); Ji Young Jo, Gwangju (KR); Hyeon Jun Lee, Gwangju (KR)

(73) Assignees: HYUNDAI MOTOR COMPANY, Seoul (KR); GWANGJU INSTITUTE OF SCIENCE AND TECHNOLOGY, Buk-Gu, Gwangju (KR)

( * ) Notice: Subject to any disclaimer, the term of this patent is extended or adjusted under 35 U.S.C. 154(b) by 323 days.

(21) Appl. No.: 14/871,452

(22) Filed: Sep. 30, 2015

(65) Prior Publication Data

US 2016/0185924 A1    Jun. 30, 2016

(30) Foreign Application Priority Data

Dec. 30, 2014  (KR) .................. 10-2014-0194118

(51) Int. Cl.
*B05D 3/00* (2006.01)
*C08J 7/04* (2006.01)

(52) U.S. Cl.
CPC .............. *C08J 7/042* (2013.01); *B05D 3/002* (2013.01); *C08J 2355/02* (2013.01); *C08J 2425/18* (2013.01); *C08J 2427/16* (2013.01); *C08J 2465/00* (2013.01)

(58) Field of Classification Search
None
See application file for complete search history.

(56) References Cited

U.S. PATENT DOCUMENTS 5,746,857 A  *  5/1998  Murata ................ G02B 5/0242
                                          156/102

FOREIGN PATENT DOCUMENTS

| JP | 01-133392 A | 5/1989 |
|---|---|---|
| JP | 2013-202843 A | 10/2013 |
| KR | 10-2009-0099398 A | 9/2009 |
| KR | 10-2009-0099399 A | 9/2009 |
| KR | 10-2010-0106714 A | 10/2010 |
| KR | 10-1220431 B1 | 1/2013 |
| WO | 2006/086081 A1 | 8/2006 |

* cited by examiner

*Primary Examiner* — Sheeba Ahmed
(74) *Attorney, Agent, or Firm* — McDermott Will & Emery LLP

(57) ABSTRACT

A high gloss acrylonitrile butadiene styrene (ABS) sheet includes an ABS substrate, an intermediate film of poly(3,4-ethylenedioxythiophen)-polystyrene sulfonate formed on top of the ABS substrate, and a fluorinated resin film of poly(vinylidene fluoride-trifluoroethylene) formed on top of the intermediate film. A method of preparing the high gloss ABS sheet is also disclosed.

4 Claims, 3 Drawing Sheets

ROUGHNESS IMPROVED HIGH GLOSS ABS SHEET AND PROCESS FOR PREPARING THEREOF

CROSS-REFERENCE TO RELATED APPLICATION

This application claims under 35 U.S.C. § 119(a) the benefit of priority to Korean Patent Application No. 10-2014-0194118 filed on Dec. 30, 2014, the entire contents of which are incorporated herein by reference.

TECHNICAL FIELD

The present disclosure relates to an acrylonitrile butadiene styrene (ABS) sheet having improved surface roughness and gloss prepared by sequentially laminating an intermediate film of poly(3,4-ethylenedioxythiophen)-polystyrene sulfonate as a water-soluble polymer and a fluorinated resin film of poly(vinylidene fluoride-trifluoroethylene) on the hydrophilized surface of an ABS substrate, and a method for preparing thereof.

BACKGROUND

Customers want quality improvement of interior as well as performance improvement of a vehicle. Vehicle interior materials play an important role in quality improvement of interior. In particular, high gloss of interior materials can embody fancier interior, and can increase customer's satisfaction.

In the case of acrylonitrile butadiene styrene (ABS), which is a representative interior material widely used today, gloss is reduced due to rough surface generated during injection molding. In order to solve the gloss reduction problem of the ABS, a method of double coating (2 coat) of a polyurethane-based high gloss coating composition on the ABS material is conducting.

Further, in Korean Patent Laid-Open Publication No. 2010-0106714 (Patent Document 1), a method for preparing a high gloss panel by forming an ABS sheet layer on one side of a decoration film, coating a hard coating composition comprising a fluorinated acrylate copolymer on top of the ABS sheet, and the hardening thereof is disclosed. The fluorinated acrylate copolymer used in the Patent Document 1 is a copolymer wherein a fluorinated compound is introduced to a backbone of an acrylate resin having three or more functional groups as a substituent.

As shown above, in the conventional method, an additional coating of a urethane resin or a fluorinated resin on parts where the ABS material is used was applied to increase gloss.

As a general method for coating the fluorinated resin, there is a powder coating method and a solution coating method.

In the powder coating method, fluorinated resin powder is sprayed to a subject to be coated, and sintered by high temperature heating to form a coating film. However, because the melting point of a general polymer to be coated such as ABS is lower than the heating temperature, the powder coating method is mainly used for coating metal rather than the polymer.

The solution coating is a method of forming a coated film by dissolving a fluorinated resin in a solvent and coating thereof on a subject to be coated, and it has an advantage that the process is conducted at a low temperature condition. However, there is a limit to directly apply the solution coating method to the general polymer to be coated such as ABS because the solvent to dissolve the resin has strong polarity. Thus, in order to prevent the ABS to be coated from dissolving by the polar solvent, a hydrophilic intermediate layer, which is not dissolved by the polar solvent, is needed. Namely, forming a hydrophilic thin film on the hydrophobic surface of the ABS to be coated is needed, and UV ozonization is mainly used. However, the UV ozonization forms scratches on the ABS substrate surface, and therefore, it makes surface roughness worse. Accordingly, it is not suitable for high gloss coating.

The above information disclosed in this Background section is only for enhancement of understanding of the background of the invention and therefore it may contain information that does not form the prior art that is already known in this country to a person of ordinary skill in the art.

SUMMARY

The present disclosure has been made in an effort to solve the above-described problems associated with prior art.

One of the objects of embodiments of the present invention isto provide a high gloss ABS sheet whose surface roughness is improved and gloss is increased at the same time.

Further, another of the objects of embodiments of the present invention is to provide a method for improving surface roughness and increase gloss of the ABS substrate at the same time through a series of coating processes.

A high gloss ABS sheet includes an ABS substrate, an intermediate film of poly(3,4-ethylenedioxythiophen)-polystyrene sulfonate formed on top of the ABS substrate, and a fluorinated resin film of poly(vinylidene fluoride-trifluoroethylene) formed on top of the intermediate film.

In certain embodiments, the ABS substrate may be hydrophilized.

In certain embodiments, the ABS substrate may be coated with a surfactant solution, and then washed with distilled water and dried.

A method of preparing a high gloss ABS sheet includes a first step of hydrophilizing the surface of an ABS substrate by coating a surfactant solution on the substrate, .a second step of washing the surfactant-coated ABS substrate with distilled water and drying surfactant-coated ABS substrate, a third step of forming an intermediate film by coating poly(3,4-ethylenedioxythiophen)-polystyrene sulfonate (PEDOT-PSS) on top of the dried ABS substrate, and a fourth step of coating a fluorinated polymer solution of poly(vinylidene fluoride-trifluoroethylene) on top of the intermediate film.

In certain embodiments, the surfactant solution may be an aqueous sodium dodecyl sulfate solution.

In certain embodiments, the drying may be conducted at a temperature range of 40 to 60° C.

In certain embodiments, a concentration of the fluorinated polymer solution may be 1 to 8 wt %, and in the fourth step, the coating may be conducted at a coating rate of 1500 to 4500 rpm.

In certain embodiments, a concentration of the fluorinated polymer solution may be 2 to 5 wt %, and in the fourth step, the coating may be conducted at a coating rate of 3000 to 4500 rpm.

In still another aspect, a vehicle interior material includes the high gloss ABS sheet.

Other aspects and preferred embodiments of the invention are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

BRIEF DESCRIPTION OF THE DRAWINGS

The above and other features of embodiments of the present invention will now be described in detail with reference to certain exemplary embodiments thereof illustrated the accompanying drawings which are given hereinbelow by way of illustration only, and thus are not limitative of the present invention, and wherein.

It should be understood that the appended drawings are not necessarily to scale, presenting a somewhat simplified representation of various preferred features illustrative of the basic principles of embodiments of the invention. The specific design features of embodiments the present invention as disclosed herein, including, for example, specific dimensions, orientations, locations, and shapes will be determined in part by the particular intended application and use environment.

DETAILED DESCRIPTION

Hereinafter reference will now be made in detail to various embodiments of the present invention, examples of which are illustrated in the accompanying drawings and described below. While exemplary embodiments of the invention are be described below, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

Embodiments of the present invention include a high gloss ABS sheet having improved surface roughness and increased gloss, and a method for preparing thereof.

In the high gloss ABS sheet according to an embodiment of the present invention, an intermediate film of poly(3,4-ethylenedioxythiophen)-polystyrene sulfonate (hereinafter, abbreviated as 'PEDOT-PSS') is formed on top of an ABS substrate, and a fluorinated resin film of poly(vinylidene fluoride-trifluoroethylene) (hereinafter, abbreviated as "P(VDF-Tree)') is formed on top of the intermediate film.

In embodiments of the present invention, instead of directly coating the fluorinated resin film on the ABS substrate, a hydrophilic polymer film of PEDOT-PSS is used as the intermediate film. Accordingly, compared to the ABS substrate, surface roughness and gloss are able to be improved.

The method for preparing a high gloss ABS plastic sheet according to an embodiment of the present invention will be described step by step in detail as follows.

The first step is a pretreatment process of semi-permanently changing the surface characteristic of the ABS substrate from hydrophobic to hydrophilic by coating a surfactant solution on top of the ABS substrate.

Figure 1:
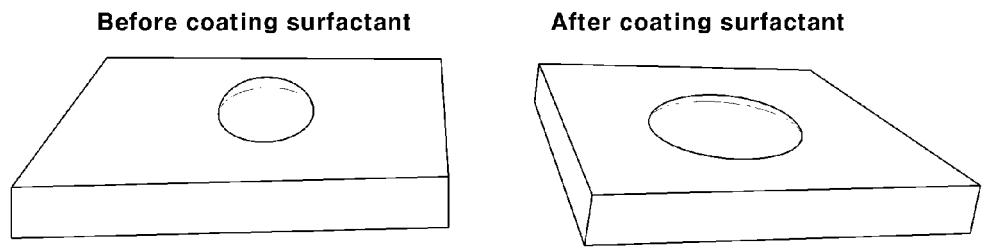
FIG. 1 is an image comparing droplet spreading phenomenon before and after coating a surfactant on the ABS substrate surface.

As illustrated by the image of FIG. 1, a droplet contact angle of the ABS substrate became significantly low by coating the surfactant solution on the ABS substrate. Thus, it can be found that the ABS substrate surface is hydrophilized.

Compared to a general hydrophilizing method, UV ozonization, the ABS substrate coated with the surfactant was able to maintain hydrophilicity more consistently.

An example of a method for treating the ABS substrate with the surfactant solution will be described in detail as follows. The surfactant solution was coated on top of the ABS substrate. At this time, sodium dodecyl sulfate was used as a surfactant, and it was added to distilled water followed by mixing thereof for 30 min or longer to obtain the surfactant solution at a concentration of 0.5 to 3 wt %. In various embodiments of the present invention, coating may be performed by various methods. For example, the surfactant solution was coated using a spin coater while sequentially increasing a rate from 500 rpm to 3000 rpm. However, the coating is not limited to spin coating; other coating methods may be used.

The second step is a process of washing the surfactant-coated ABS substrate with distilled water and drying thereof.

In certain embodiments, this is a process of washing with distilled water to enhance the surface of the ABS substrate, which became rough due to the surfactant coating. The washing time may vary depending on water intensity. In certain embodiments, it may be conducted for about 20 sec to 1 min. The ABS substrate washed with distilled water is dried at a temperature range of 40 to 60° C. for about 10 to 60 min.

Figure 2:
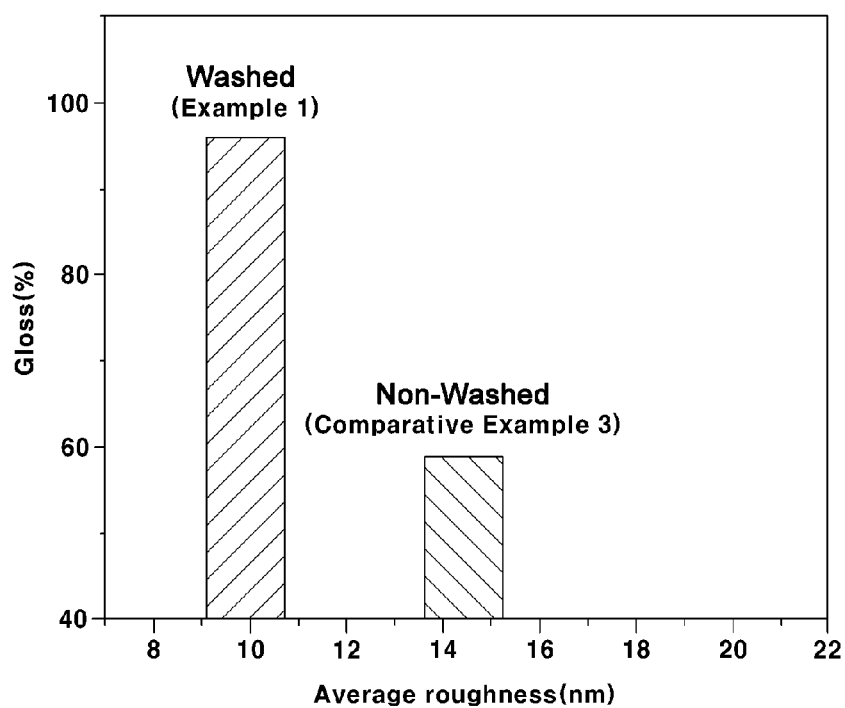
FIG. 2 is an graph comparing gloss of the ABS substrate surface depending on whether a washing process is conducted after surfactant coating or not.

In FIG. 2, the result of comparing gloss of the ABS substrate surface depending on whether the washing process is conducted after surfactant coating or not is shown. According to FIG. 2, it could be confirmed that surface roughness and gloss of the ABS substrate that is additionally subjected to the distilled water washing process is improved.

The third step is a process of forming the intermediate film by coating the substrate with the PEDOT-PSS polymer solution.

Namely, this is a process of coating the water soluble polymer of PEDOT:PSS on the surfactant-coated ABS substrate surface. The ABS substrate is semi-permanently hydrophilized through the pretreatment process of coating with the surfactant, and therefore, an effect of making the water soluble polymer of PEDOT:PSS possible to form a more homogeneous water soluble polymer film can be obtained.

In an embodiment, the coating of the PEDOT-PSS was conducted by coating using a spin coater while increasing a rate from 500 rpm to 3000 rpm. However, other coating methods and rates may be used.

The fourth step is a process of coating the fluorinated polymer solution.

As the fluorinated polymer, P(VDF-TrFE) having weight average molecular weight of 10,000 or more, preferable of a range of 50,000 to 1,000,000 was used. The P(VDF-TrFE) was dissolved in a polar solvent, 2-butanone, before use, and preferably, it was completely dissolved by stirring at a temperature of 80 to 90° C. and a rate of 400 rpm for about 1 hour before use.

In certain embodiments, a concentration of the fluorinated polymer solution may be in a range of 1 to 8 wt %. In certain embodiments, the concentration of the fluorinated polymer solution may be in a range of 2 to 7 wt %. In certain embodiments, a rate of coating the P(VDF-TrFE) solution on the ABS substrate may be maintained at 1500 to 4500 rpm. In certain embodiments, a rate of coating the P(VDF-TrFE) solution on the ABS substrate may be 3000 to 4500 rpm. As generally, there is a tendency that gloss is increased as a coating rate is increased, average gloss was sharply improved to 90% or more at a coating rate of 3000 rpm or more.

Figure 3:
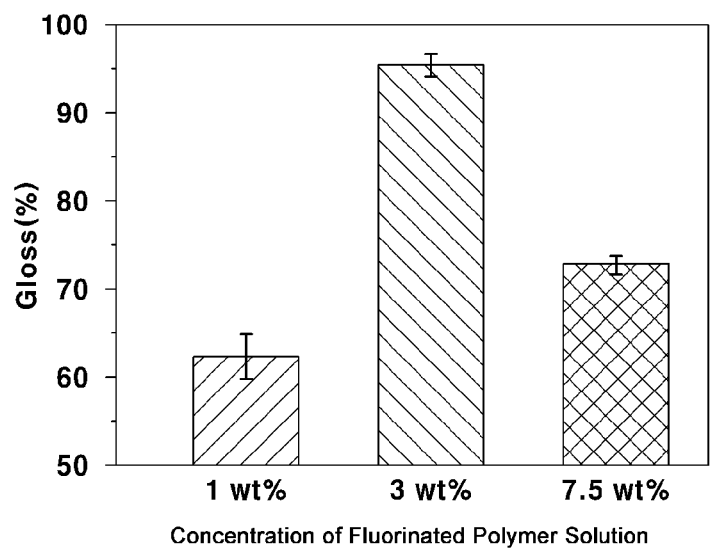
FIG. 3 is a graph comparing gloss change depending on a concentration of P(VDF-TrFE) solution.

FIG. 3 is a graph comparing gloss change depending on a concentration of P(VDF-TrFE) solution. Namely, when coating the P(VDF-TrFE) solution on the ABS substrate at a coating rate of 3500 rpm, the fluorinated polymer solution was prepared at a concentration of 1 wt %, 3 wt % and 7.5 wt %, respectively, coated, and then gloss was compared. According to FIG. 3, it could be confirmed that gloss was the best as 95% or more when a concentration of the P(VDF-TrFE) solution was 3 wt %.

EXAMPLES

The following examples illustrate embodiments of the invention and are not intended to limit the scope of the invention.

Example 1

1) Surfactant Coating Process

An 5 cm×5 cm ABS substrate was prepared. Sodium dodecyl sulfate (Product of Sigma-Aldrich) was added to distilled water, and mixed for 30 min or longer to prepare a surfactant solution at a concentration of 3 wt %. A surfactant solution was coated on top of the ABS substrate using a spin coater while sequentially increasing a rate from 500 rpm→1000 rpm→3000 rpm.

2) Process of Washing with Distilled Water and Drying

In order to enhance roughness of the surface caused by surfactant coating, the ABS substrate was washed under running distilled water for 30 sec. The ABS substrate washed with distilled water was dried using a hot plate at 50° C. for 10 min.

3) Process of Forming Water Soluble Polymer Intermediate Film

PEDOT:PSS polymer (Product of Heraeus, German) was filtered through a 0.45 μm syringe filter (Manufacturer: advantec), and then used as a coating solution. The PEDOT:PSS coating solution was coated on top of the ABS substrate using a spin coater while sequentially increased a rate from 500 rpm→1000 rpm→3000 rpm.

4) Process of Forming Fluorinated Resin Film

As a fluorinated polymer, P(VDF-TrFE) having weight average molecular weight of 200,000 (Product of piezotech, France) was used. The P(VDF-TrFE) was dissolved in 2-butanone (Product of Sigma-aldrich, 99.7% pure) to prepare a solution at a concentration of 3 wt %. The P(VDF-TrFE) solution was coated on top of the ABS substrate using a spin coater at a coating rate of 3500 rpm.

Gloss, surface roughness and contact angle of the ABS sheet prepared above were measured, and shown in the following Table 1.

Comparative Example 1

A 5 cm×5 cm ABS substrate was used as Comparative Example 1, and it was marked as bare ABS in the following Table 1. Gloss, surface roughness and contact angle of the bare ABS were measured, and shown in the following Table 1.

Comparative Examples 2 to 4

In preparing the ABS sheet according to Comparative Examples 2-4, after coating the surfactant, the process of washing with distilled water was omitted. And, in Comparative Examples 2 to 4, when coating the 3 wt % fluorinated resin solution is coated on top of the ABS substrate coated with the water soluble polymer intermediate film, a coating rate was changed to 3000 rpm (Comparative Example 2), 3500 rpm (Comparative Example 3) and 5000 rpm (Comparative Example 4), respectively.

Gloss, surface roughness and contact angle of the ABS sheets prepared in Comparative Examples 2 to 4 were measured, and shown in the following Table 1.

Comparative Examples 5 to 7

In preparing the ABS sheet according to Comparative Examples 5 to 7, the fluorinated resin was coated while changing a concentration of the coating solution or a coating rate from that of Example 1.

Namely, Comparative Example 5 is an example of preparing the ABS sheet by preparing a fluorinated resin solution of 3 wt %, and coating thereof while increasing a coating rate to four steps from 500 rpm→1000 rpm→2000 rpm→3500 rpm, thereby preparing an ABS sheet. Comparative Example 6 is an example of preparing a fluorinated resin solution of 1 wt %, and coating thereof while maintaining a coating rate to 3500 rpm, thereby preparing an ABS sheet. Comparative Example 7 is an example of preparing a fluorinated resin solution of 7.5 wt %, and coating thereof while maintaining a coating rate to 3500 rpm, thereby preparing an ABS sheet.

Gloss, surface roughness and contact angle of the ABS sheets prepared in Comparative Examples 5 to 7 were measured, and shown in the following Table 1.

TABLE 1

| Section | | Example 1 | Comparative Example 1 | 2 | 3 | 4 | 5 | 6 | 7 |
|---|---|---|---|---|---|---|---|---|---|
| Fluorinated Resin | Conc. (wt %) | 3 | Bare ABS | 3 | 3 | 3 | 3 | 1 | 7.5 |
| | Coating Rate (rpm) | 3500 | | 3000 | 3500 | 5000 | 3500 (4 step) | 3500 | 3500 |
| Whether conducting Washing Process or not | | Yes | | No | No | No | Yes | Yes | Yes |
| Gloss | | 96 | 85.4 | 58.8 | 55 | 71.0 | 65.6 | 62.3 | 72.9 |
| Roughness (nm) | | 12.5 | 31.0 | 10.8 | 15.8 | 19.7 | Not | Not | Out |
| Average Roughness (nm) | | 9.9 | 24.0 | 8.6 | 19.6 | 15.4 | Not | Not | Out |
| Contact Angle (°) | | 85.6 | 78.3 | — | — | — | — | — | — |

Not: not measured
Out: Impossible to measure because it is over rms 300 nm

Figure 4:
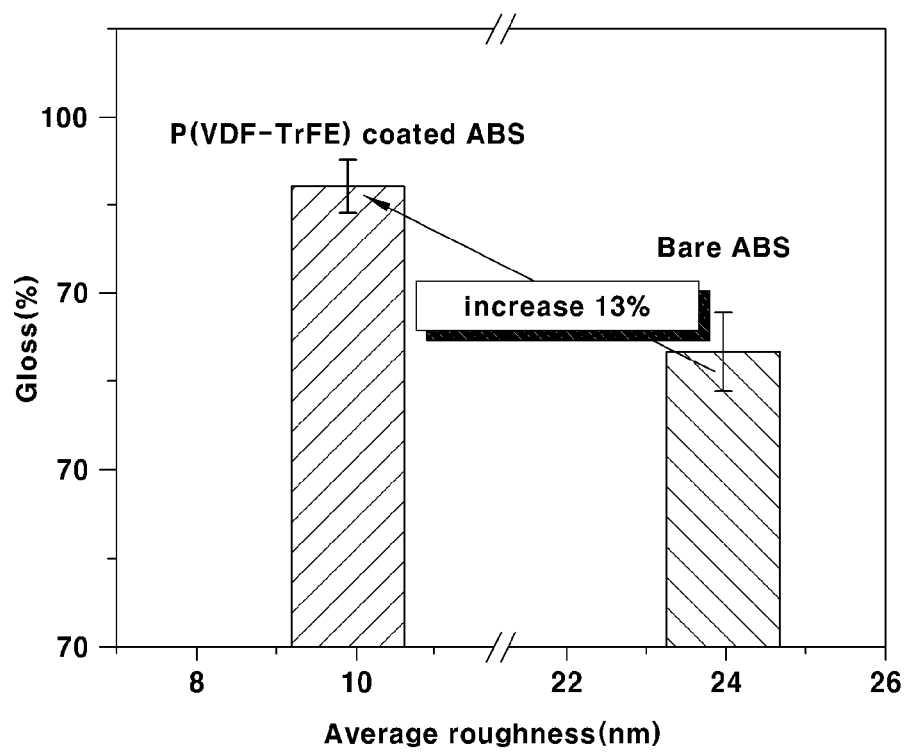
FIG. 4 is a graph comparing 60° (degree) gloss change of the ABS sheet prepared in Example 1 and the bare ABS substrate of Comparative Example 1.
Figure 5:
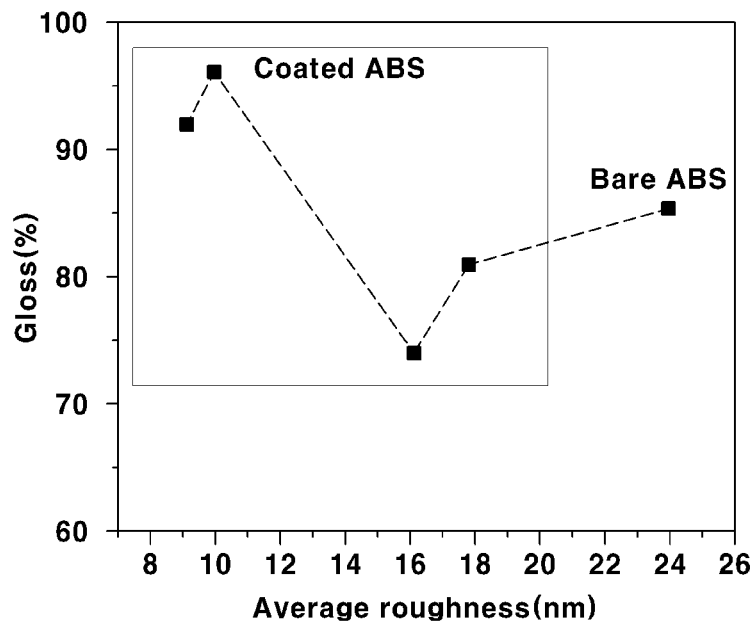
FIG. 5 is a graph comparing surface roughness change of the ABS sheet prepared in Example 1 and the bare ABS substrate of Comparative Example 1.
Figure 6:
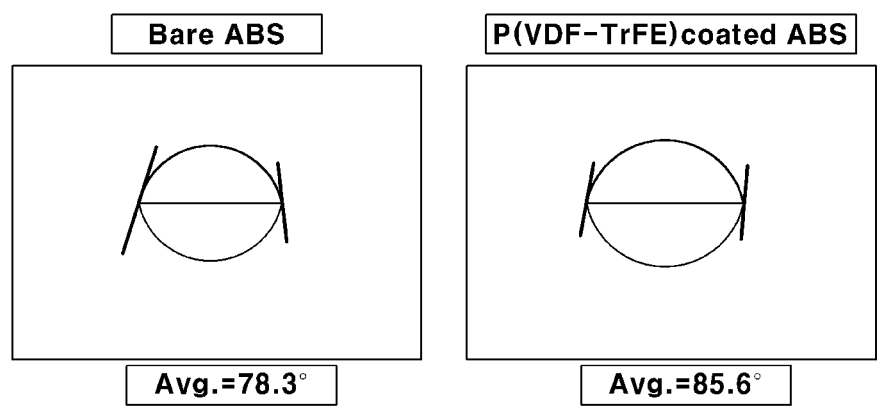
FIG. 6 is an image comparing a droplet contact angle of the ABS sheet prepared in Example 1 and the bare ABS substrate of Comparative Example 1.

Further, in FIGS. 4-6, the results of measuring 60° (degree) gloss change, surface roughness change, and droplet contact angle of the bare ABS substrate of Comparative Example 1 and the ABS sheet prepared in Example 1 were compared.

FIG. 4 is the result of comparing gloss, it could be confirmed that gloss of the ABS sheet prepared in Example 1 was improved about average 13%, compared to the ABS substrate surface.

An image of the 30×30 surface area was obtained using an AFM, root mean square (rms), that is a surface roughness value, was calculated, and the illustrated in FIG. 5. It could be confirmed that surface roughness was improved average 59%.

FIG. 6 is the result of comparing droplet contact angle, and it could be confirmed that surface hydrophobicity was improved.

According to embodiments of the present invention, instead of conducting a process of coating a polyurethane coating composition, high gloss can be realized to an ABS plastic material by coating a fluorinated resin.

The high gloss ABS sheet prepared in embodiments of the present invention is useful as a vehicle interior material.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A high gloss acrylonitrile butadiene styrene (ABS) sheet, comprising:
   an ABS substrate;
   an intermediate film of poly(3,4-ethylenedioxythiophen)-polystyrene sulfonate formed on top of the ABS substrate; and
   a fluorinated resin film of poly(vinylidene fluoride-trifluoroethylene) formed on top of the intermediate film.

2. The high gloss ABS sheet of claim 1, wherein the ABS substrate is hydrophilized.

3. The high gloss ABS sheet of claim 1, wherein the ABS substrate is coated with a surfactant solution, and then washed with distilled water and dried.

4. A vehicle interior material comprising the high gloss ABS sheet of claim 1.

* * * * *